United States Patent [19]

Okada et al.

[11] Patent Number: 4,525,317
[45] Date of Patent: Jun. 25, 1985

[54] METHOD AND APPARATUS FOR STRETCHING FILM OR FIBROUS WEB

[75] Inventors: Tokio Okada; Haruhisa Tani; Shigezo Kojima; Kazuhiko Kurihara, all of Tokyo; Hirosi Yazawa, Kunitachi, all of Japan

[73] Assignees: Nippon Petrochemicals, Co., Ltd., Chiyoda; Polymer Processing Research Institute Ltd., Toyko, both of Japan

[21] Appl. No.: 502,976

[22] Filed: Jun. 10, 1983

[30] Foreign Application Priority Data

Jun. 15, 1982 [JP] Japan .................................. 57-102750

[51] Int. Cl.³ .............................................. B29C 17/02
[52] U.S. Cl. ..................................... 264/235.8; 26/72; 26/82; 26/85; 264/288.8; 264/289.6; 264/290.2
[58] Field of Search ................... 26/72, 82, 88, 90, 85; 264/154, 159, 235.8, 288.8, 290.2, 289.6

[56] References Cited

U.S. PATENT DOCUMENTS

| 3,807,004 | 4/1974 | Anderson | 26/88 |
| 3,884,748 | 5/1975 | Anderson | 26/90 |
| 4,331,624 | 5/1982 | Yazawa | 264/290.2 |
| 4,349,500 | 9/1982 | Yazawa | 264/290.2 |
| 4,434,128 | 2/1984 | Okada | 26/82 |

FOREIGN PATENT DOCUMENTS

| 57-41923 | 8/1982 | Japan | 264/290.2 |
| 57-53325 | 8/1982 | Japan | 264/290.2 |
| 57-47623 | 8/1982 | Japan | 264/290.2 |

Primary Examiner—James Lowe
Attorney, Agent, or Firm—Bucknam & Archer

[57] ABSTRACT

A film or fibrous web which has been stretched by moving at least two laterally spaced first longitudinal portions gripped by a first gripping means along at least two arcuate divergent paths formed jointly by at least two radially disposed first pulleys and endless belt means trained arcuately therearound, is further stretched by moving at least two laterally spaced second longitudinal portions adjacent to the first longitudinal portions gripped by a second gripping means along at least two arcuate divergent paths contiguous to the first arcuate divergent paths, respectively, formed jointly by at least two second pulleys, respectively, disposed downstream of and close to the first pulleys in coplanar relation thereto and second endless belt means trained arcuately therearound. The film while being stretched is heated to a temperature suitable for stretching with heated air and the like, or is softened by immersing in a bath of solvent or plasticizer.

14 Claims, 7 Drawing Figures

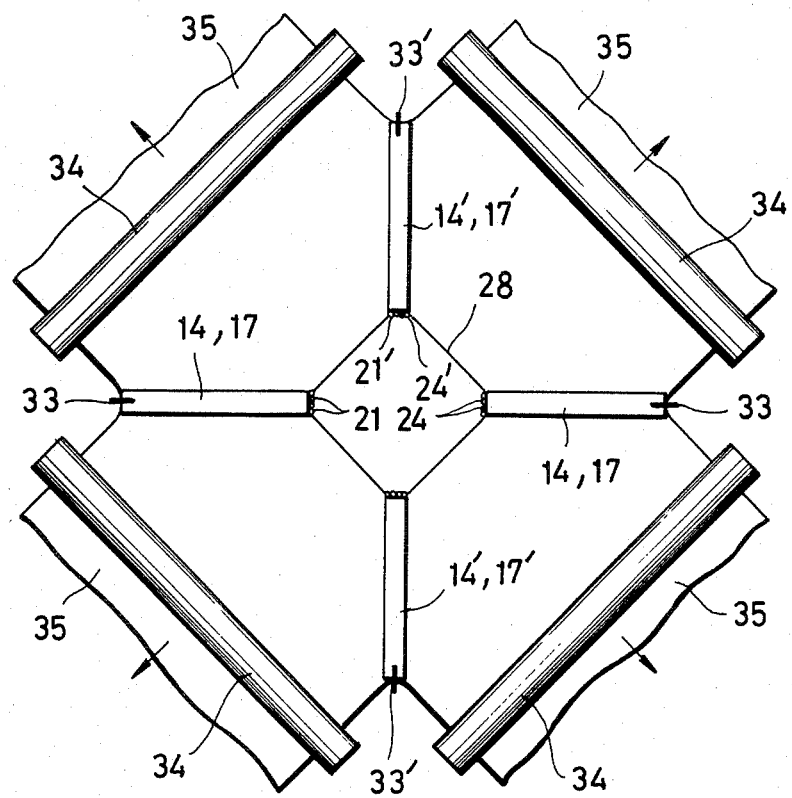

METHOD AND APPARATUS FOR STRETCHING FILM OR FIBROUS WEB

BACKGROUND OF THE INVENTION

1. Field of the Invention

The present invention relates to a method of and an apparatus for stretching a thermoplastic polymer film or fibrous web monoaxially in a transverse direction or biaxially in transverse and longitudinal directions at the same time.

2. Prior Art

Various methods and apparatus have been employed in the art for transverse stretching or longitudinal and transverse stretching of a film or fibrous web. A typical example of such known methods and apparatus is a tentering system designed to grip the opposite selvages of a film or fibrous web and stretch the same monoaxially in a transverse direction or biaxially in longitudinal and transverse directions. Such system is however rather costly, space-consuming and complicated in structure. Another example known in the art is a tubular system which has been used frequently for biaxial stretching of a film. This system is relatively inexpensive to construct and takes up a relatively small space for installation, but it is not stable in operation and difficult to produce a film of good quality having a high magnification of stretch, and in particular the stretched film is difficult to heat treat upon stretching.

According to still another known system disclosed in each of U.S. Pat. Nos. 4,331,624 and 4,349,500, patented May 25 and Sept. 14, 1982, respectively, both assigned to the present assignees, a film is gripped along opposite selvages thereof between a pair of coplanar pulleys rotating in opposite directions and a pair of endless belt means trained arcuately around the pulleys, and then stretched by moving the gripped film selvages, respectively, along a pair of divergent substantially semicircular arcuate paths formed around the pulleys.

Although the disclosed system has performed satisfactorily in reducing all the drawbacks observed in the aforementioned two systems, it has not been found to be entirely suitable in application wherein the stretched film is required to have excellent properties. Since the film is reversed in direction of travel during movement of the gripped selvages along the arcuate paths, the non-supported central web portion is likely to take a short-cut or to be distorted upstream of its travelling path where the film is reversed, under longitudinal contractive stresses created during lateral stretching of the film. The stretched film is irregular in molecular orientation and strength. Further, it is difficult to stretch the film longitudinally and transversely at the same time, or transversely at a high magnification of stretch, solely by means of only one pair of pulleys.

SUMMARY OF THE INVENTION

According to the present invention, a film or fibrous web which has been stretched by moving at least two laterally spaced first longitudinal portions gripped by a first gripping means along at least two arcuate divergent paths formed jointly by at least two radially disposed first pulleys and an equal number of endless belt means trained arcuately therearound, is further stretched by moving at least two laterally spaced second longitudinal portions adjacent to the first longitudinal portions gripped by a second gripping means along at least two arcuate divergent paths respectively contiguous to the first arcuate divergent paths, formed jointly by at least two second pulleys respectively disposed downstream of and close to the first pulleys in coplanar relation thereto and an equal number of second endless belt means trained arcuately therearound. The film while being stretched is conditioned to a state suitable for stretching by heating it or immersing it in a bath of solvent or plasticizer.

It is an object of the present invention to provide a method of and an apparatus for stretching a thermoplastic polymer film or fibrous web which will reduce or substantially eliminate the foregoing drawbacks of the prior art.

Another object of the present invention is to provide a method of manufacturing a transversely or longitudinally and transversely stretched film or fibrous web of good quality at a high rate of speed and magnification of stretch.

A further object of the present invention is to provide an apparatus for carrying out such a method.

Still another object of the present invention is to provide an apparatus for stretching a film or fibrous web, which apparatus is simple in structure and inexpensive to construct and will take up a relatively small space.

The above and other objects, features and advantages of the present invention will become apparent from the following detailed description when taken in connection with the accompanying drawings which illustrate preferred embodiments of the present invention by way of example.

BRIEF DESCRIPTION OF THE DRAWINGS

FIG. 7 is a schematic plan view of an apparatus according to another embodiment, illustrating a tubular film as being stretched by the apparatus and cut into four sheets of film, the apparatus comprising four radially disposed sets of first and second pulleys.

DETAILED DESCRIPTION

Figure 1:
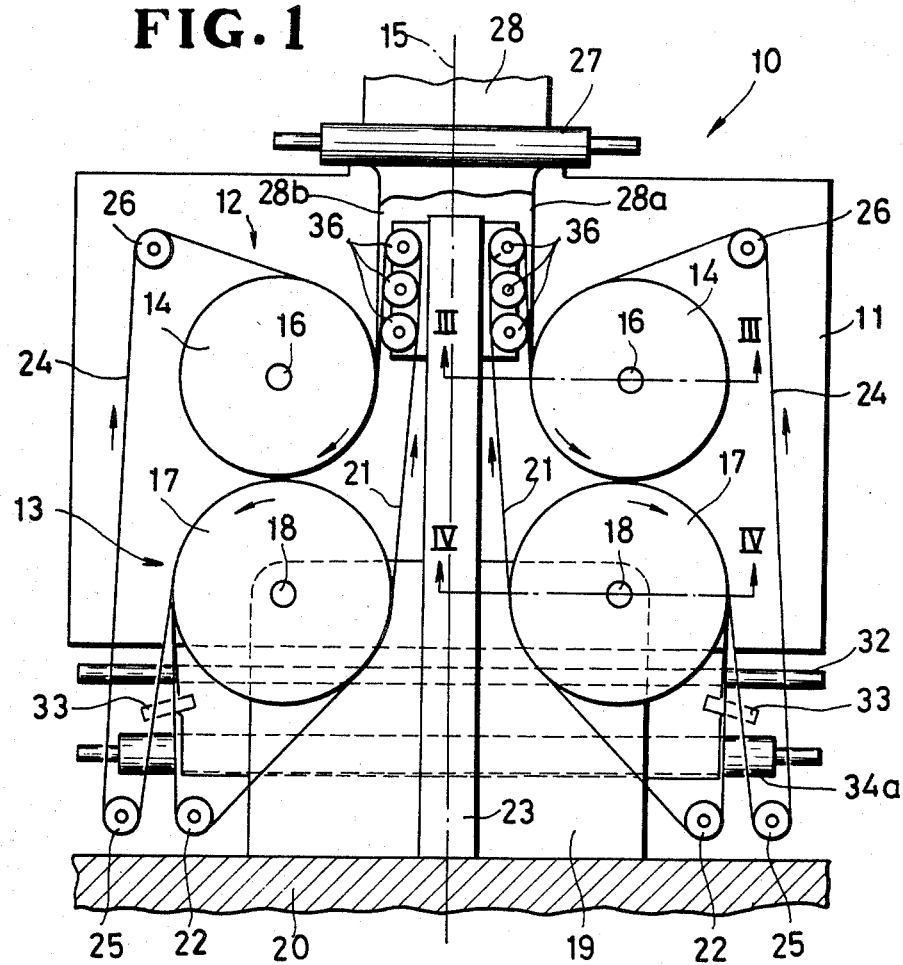
FIG. 1 is a schematic front elevational view of an apparatus according to one embodiment of the present invention.
Figure 2:
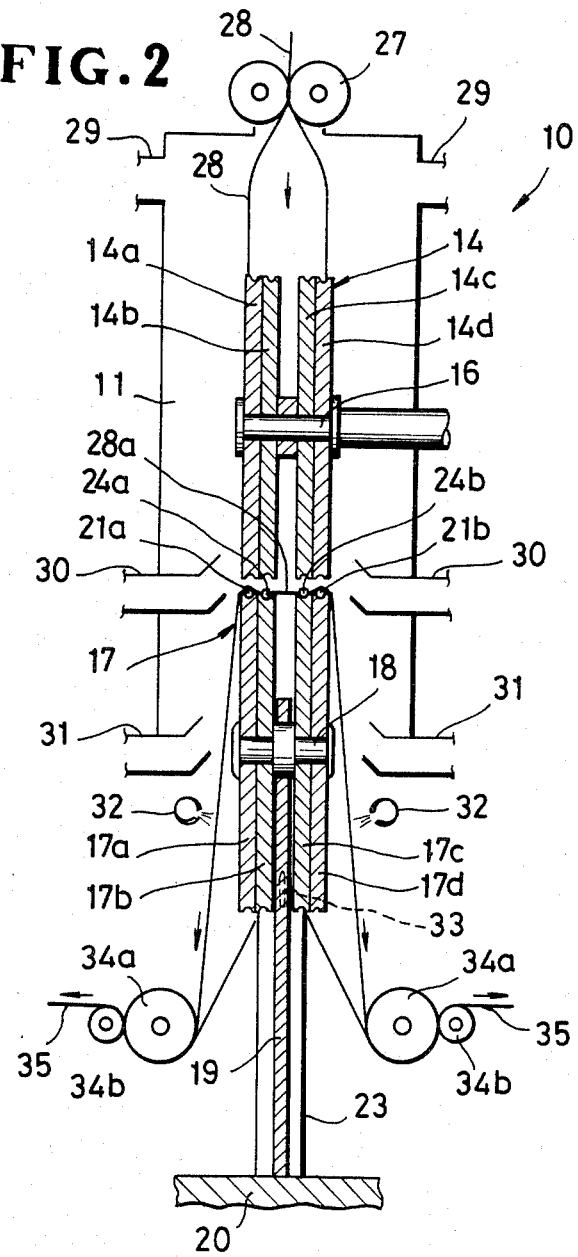
FIG. 2 is an enlarged schematic vertical cross-sectional view of the apparatus, showing a pair of upper and lower gripping means of the apparatus.

As shown in FIGS. 1 and 2, an apparatus 10 for stretching films or fibrous webs comprises a heating chamber 11 and a pair of set of upper and lower gripping means 12, 13 disposed substantially within the heating chamber 11. The upper gripping means 12 includes a pair of first pulleys 14, 14 of substantially the same dimensions disposed coplanarly and symmetrically in horizontal alignment across a vertical reference center line 15 (FIG. 1). Each of the pulleys 14, 14 is rotatably mounted on a horizontal shaft 16 supported on an outer frame (not shown) outside the heating chamber 11. Likewise, the lower gripping means 13 includes a pair of second pulleys 17, 17 of substantially the same dimensions disposed coplanarly and symmetrically in horizontal alignment across the vertical reference central line 15. Each of the second pulleys 17, 17 is rotatably mounted on a horizontal shaft 18 supported on an upstanding bracket 19, the bracket 19 and the outer frame being mounted on a horizontal base 20. The second pulleys 17, 17 have a diameter slightly larger than the diameter of the first pulleys 14, 14, and the first and second pulleys 14, 17 are very close to one another at their peripheries.

The upper gripping means 12 further includes a pair of first endless belt means 21, 21 trained arcuately around the first and second pulleys 14, 17 in symmetrical relation with respect to the vertical reference center line 15. Each of the endless belt means 21, 21 is trained around a first drive pulley 22 driven by a suitable drive means (not shown) to rotate the pulleys 14, 17 at a peripheral speed in opposite directions shown by the arrows in FIG. 1, the drive pulley 22 being disposed below the pulley 17. Each endless belt means 21 is also guided around idle rollers 36 rotatably supported on the upper end of a vertical hollow column 23 extending from the base 20 upwardly between the two sets of first and second pulleys 14, 17 in alignment with the vertical reference center line 15, the rollers 36 being located upwardly of the pulley 14. The drive pulley 22 and the idle rollers 36 are arranged in such a manner that each endless belt means 21 trained therearound is held in engagement with one of the first pulleys 14, 14 substantially over a quarter of the full circumference of the pulley 14 on the inner side thereof, passes between the first pulley 14 and a cooperating one of the second pulleys 17, and is held in engagement with the second pulley 17 substantially over a quarter of the full circumference of the pulley 17 on the outer side thereof. Each first endless belt means 21 has a running path including a portion extending between the two sets of pulleys 14, 17 along the vertical central line 15.

Likewise, the lower gripping means 13 further includes a pair of second endless belt means 24, 24 trained arcuately around the first and second pulleys 14, 17 in symmetrical relation with the vertical reference center line 15. Each endless belt means 24 is trained around a second drive pulley 25 driven by means of a suitable drive means (not shown) to rotate the pulley 14, 17 at a peripheral speed in opposite directions, the drive pulley 25 being disposed below the pulley 17 in horizontal alignment with the first drive pulley 22. The endless belt means 24 is also guided around an idle roller 26 rotatably mounted on the outer frame at a position upward of the first pulley 14. The drive pulley 25 and the idle roller 26 are arranged in such a manner that each endless belt means 24 trained therearound is held in engagement with one of the first pulleys 14, 14 substantially over a quarter of the full circumference of the pulley 14 on the inner side thereof, passes between the first pulley 14 and a cooperating one of the second pulleys 17, and is held in engagement with the second pulley 17 substantially over a quarter of the full circumference of the pulley 17 on the outer side thereof. Each second endless belt means 24 has a running path including a portion disposed outside the pulleys away from the vertical reference center line 15.

A pair of horizontal pinch rollers 27, 27 is disposed upwardly of the heating chamber 11 for feeding a tubular film 28 in flattened form down a longitudinal path extending along the vertical reference center line 15.

Figure 3:
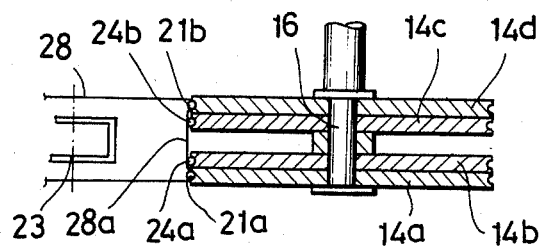
FIG. 3 is an enlarged horizontal cross-sectional view taken along line III—III of FIG. 1, showing an upper part of the gripping means.
Figure 4:
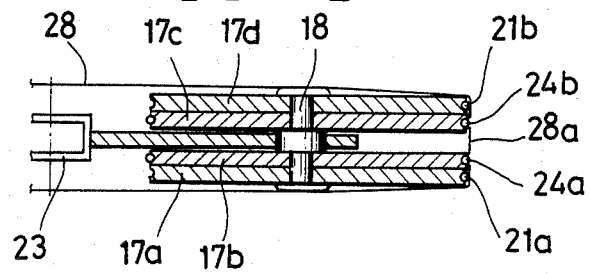
FIG. 4 is an enlarged horizontal cross-sectional view taken along line IV—IV of FIG. 1, showing a lower part of the gripping means.

As shown in FIGS. 2-4, each of the first pulleys 14 is composed of four identical pulley members 14a-14d, each rotatably mounted on the shaft 16 and having a peripheral groove of substantially semicircular cross section, respectively. Two of the pulley members 14a and 14b, 14c and 14d are juxtaposed together, and two inner pulleys 14b, 14c are axially spaced from each other. Likewise, each of the second pulleys 17 is composed of four identical pulley members 17a-17d, each rotatably mounted on the shaft 18 in vertical alignment with the first pulley members 14a-14d, and having a peripheral groove of substantially semicircular cross section. Two of the pulley members 17a and 17b, 17c and 17d are juxtaposed together, and two inner pulley members 17b, 17c are axially spaced from each other and disposed one on each side of the upstanding bracket 19.

Each of the first endless belt means 21 includes a pair of endless cords 21a, 21b of circular cross section received, respectively, in the peripheral grooves of the outer first pulley members 14a, 14d and of the outer second pulley members 17a, 17d. Each of the second endless belt means 24 also includes a pair of endless cords 24a, 24b of circular cross section received, respectively, in the peripheral grooves of the inner first pulley members 14b, 14c and of the inner second pulley members 17b, 17c. With this arrangement, the outer and inner pulley members 14a, 14d, 17a, 17d and 14b, 14c, 17b, 17c are rotatable independently at respective peripheral speeds upon rotation of the drive pulleys 22, 25. When the first and second pulleys 14, 17 are driven to rotate at the same peripheral speed, each of the first pulleys 14 may be composed of a single pulley member having two pairs of parallel peripheral grooves for receiving the endless cords 21a, 21b, 24a, 24b of one of the first and second endless belt means 21, 24, and each of the second pulleys 17 may be composed of a pair of independently rotatable pulley members each having a pair of parallel peripheral grooves for receiving therein the endless cord 21a, 21b or 24a, 24b of one of the first and second endless belt means 21, 24.

The tubular film 28 is fed downwardly along the longitudinal path by the pinch rollers 27, 27 at the first pulleys 14, 14. As the film 28 progresses, it envelops the rollers 36 and the vertical runs of the first belt means 21, 21, whereupon the film 28 is supported at its opposite selvages 28a, 28b by the vertical runs of the first belt means 21, 21. The selvages 28a, 28b are progressively spaced by the endless cords 21a, 21b from the inside of the tubular film 28 against the peripheries of the first pulley members 14a, 14d, the pulleys 14, 14 being rotated in opposite directions shown by arrows in FIG. 1 at a peripheral speed. Rotation of the pulley members 14a, 14d causes the film selvages 28a, 28b to be progressively gripped tightly between the endless cords 21a, 21b and the pulley members 14a, 14d, and advanced along a pair of first arcuate divergent paths, respectively, that correspond to lower inner quarters of the confronting peripheral edges of the pulley members 14a, 14d. The film 28 is stretched transversely as the gripped selvages 28a, 28b are carried by the pulley members 14a, 14d progressively away from each other. During that time, the cords 24a, 24b of the second endless belt means 24 trained around the pulley members 14b, 14c, are disposed outside the film selvages 28a, 28b as shown in FIG. 3 so that they have nothing to do with the gripping of the tubular film 28.

At the ends of the first arcuate divergent paths, the first endless cords 21a, 21b are moved away from the peripheral grooves in the pulley members 14a, 14d into the peripheral grooves in the pulley members 17a, 17d, and at the same time, the second endless cords 24a, 24b are moved away from the peripheral grooves in the pulley members 14b, 14c into the peripheral grooves in the pulley members 17b, 17c, whereby the selvages 28a, 28b are progressively pressed by the endless cords 24a, 24b from the outside of the tubular film 28 against the peripheries of the pulley members 17b, 17c, the pulleys 17 each being rotated in opposite directions to those of the first pulleys 14, shown by the arrows in FIG. 1 at a peripheral speed. Rotation of the pulley members 17b, 17c causes the film selvages 28a, 28b to be progressively gripped tightly between the endless cords 24a, 24b and the pulley members 17b, 17c, and advanced along a pair of second arcuate divergent paths, respectively, that are contiguous to the first arcuate divergent paths and correspond to upper outer quarters of the opposite peripheral edges of the pulley members 17b, 17c. Thus, the film 28 is further stretched transversely as the gripped selvages 28a, 28b are carried by the pulley members 17b, 17c progressively away from each other. During that time, the cords 21a, 21b of the first endless belt means 21 trained around the pulley members 17a, 17d are disposed inside the film selvages 28a, 28b as shown in FIG. 4 so that they have no function to grip the tubular film 28 but simply support the film selvages 28a, 28b from the inside of the tubular film 28.

The heating chamber 11 includes three pairs of ducts 29-31 spaced at vertical distances. A heating medium such as hot air is introduced through the ducts 30, 31 into the heating chamber 11 and discharged therefrom through the uppermost ducts 29 so that the film 28 is heated to a temperature suitable for stretching as it is fed along the longitudinal path and stretched transversely. Additional hot air may be introduced into the heating chamber 11, or more specifically, into the tubular film 28 through the hollow column 23 (FIG. 1). The film 28 may be heated by other other means such as infrared rays, steam, hot water, hot oil and the like. Alternatively the film 28 can be stretched at the room temperature when it is softened with a suitable solvent or plasticizer, as by immersing in a bath of such agent.

The stretched film 28 is cut along the selvages 28a, 28b by a pair of cutter blades 33, 33 into a pair of severed sheets 35, 35. The cutter blades 33, 33 each extend in a space between the inner pulley members 17b, 17c, adjacent to or preferably, as shown in the illustrated embodiment, downstream of a position where the tubular film 28 is released from the second pulleys 17, 17 and the second endless belt means 24, 24. While the stretched film 28 is moved from the point of release to the cutter blades 33, 33, it is supported from the inside thereof by the vertical runs of the respective first endless belt means 21, 21 which extend parallel downwardly from the points of release or the ends of the second aucuate divergent path. During that time, the film 28 may be further heated to heat set for dimensional stabilization and then cooled by a cooling medium such as cold water or air sprayed from a pair of coolant pipe 32, 32 disposed outside the film 28 between the bottom of the heating chamber 11 and the cutter blades 33, 33, the pipes 32, 32 extending transversely across the stretched film 28. The sheets 35, 35 are withdrawn in opposite directions indicated by arrows in FIG. 2 by two pairs of withdrawal rollers 34a, 34b that rotate at a peripheral speed.

When the tubular film 28 is to be stretched biaxially, or in longitudinal and transverse directions on the apparatus 10, the first and second pulleys 14, 17 and the withdrawal rollers 34a, 34b are usually driven to rotate at the same peripheral speed which is greater than the speed of feed of the tubular film 28. It is preferable, however, that the first pulleys 14 are driven to rotate at a peripheral speed substantially equal to that of the film 28, the second pulleys are driven to rotate at a peripheral speed greater than the peripheral speed of the first pulleys, and the withdrawal rollers 34a, 34b are driven to rotate at a peripheral speed substantially equal to that of the second pulleys 17. With this arrangement, the tubular film 28 is stretched longitudinally and transversely at the same time.

When the tubular film 28 is to be stretched monoaxially in transverse direction on the apparatus 10, the second pulleys 17 are driven to rotate at a peripheral speed smaller than that of the first pulleys 14. The difference in peripheral speed between the first and second pulleys 14, 17 causes the film 28 to be corrugated or folded in the longitudinal direction thereof before the film 28 is moved around the second pulleys 17 for second transverse stretching. The folds thus made take up or compensate longitudinal contractive stresses created in the film during its transverse stretching, with the result that the film 28 is stretched transversely at a high magnification of stretch without rupture.

Figure 5:
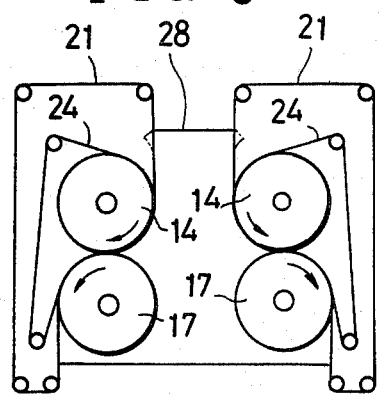
FIG. 5 is a diagrammatical view showing a modification of the gripping means.
Figure 6:
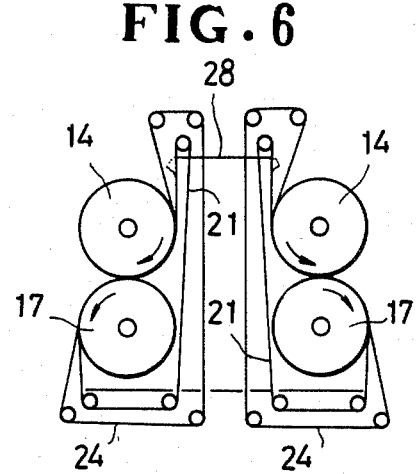
FIG. 6 is a view similar to FIG. 5, showing another modification of the gripping means.

Although the present invention has been described hereinabove in detail as embodied in an apparatus for stretching the tubular film, it is also applicable to the stretching of thermoplastic polymer film or fibrous web in the form of a sheet. In such instance, a film sheet is folded or bent along its opposite selvages into an L and the folded selvages are introduced, respectively, between the first pulleys 14 and the first endless belt means 21, then between the second pulleys 17 and the second belt means 24. The first and second pulleys 14, 17 are positioned very close to or substantially in contact with one another for smooth transfer of the film selvages from the first to the second pulleys 14, 17. A auxiliary rings (not shown) may be used for pressing the selvages against the peripheral edge portions of the second pulleys 17. As shown in FIGS. 5 and 6, the first and second endless belt means 21, 24 may be arranged to run either exending through the sets of first and second aucuate divergent paths and then between the first and second pulleys 14, 17 upwardly along the longitudinal path of the film (FIG. 6), or through the first and second arcuate divergent paths and then around outside the first and second pulleys 14, 17 (FIG. 5). With these arrangements, the folded film selvages can be introduced into the first arcuate divergent paths, respectively, between the first and second endless belt means 21, 24 in a direction perpendicular to the general plane of the pulleys 14, 17.

Each of the endless belt means may comprise belts such as V-belts, flat belts, timing or synchronous belts, ropes, cords, wires or yarns made of either inorganic fibers such as steel or organic fibers such as polyester. The pulleys may be coated around their grooved peripheries with a layer of heat-resistant elastomer or fabric.

The method and apparatus according to the invention is suitable for stretching films or fibrous webs of various materials. More specifically, a variety of films or fibrous webs made of thermoplastic polymer such as polyethylene, polypropylene, polyvinyl alcohol, polyamide, polyester, polyvinyl chloride, polyvinylidene chloride, polycarbonate, fluoroethylene resin, and modifications thereof. Multi-layer films made of those polymers or their modifications mentioned above, and adhesive polymers such as ethylene-vinyl acetate copolymer can be stretched by the apparatus. The films to be stretched can include, besides unstretched ones, those which have been monoaxially oriented by, for example, stretching or rolling. The present invention is also applicable to fibrous webs including spunbond fibers, perforated films, composites of non-stretched yarns, and non-stretched films having continuous or discrete slits extending transversely between the opposite selvages thereof at longitudinal intervals, adjacent rows of the discrete slits being staggered with respect to one another.

EXAMPLE 1

A melt-extruded, water-quenched tubular film 28 of polypropylene (M.I, 1.8) having a thickness of 0.34 mm and a lay-flat width of 700 mm was stretched biaxially in longitudinal and transverse direction by the apparatus shown in FIG. 7. The apparatus was similar to the apparatus 10 shown in FIG. 1 but comprised a first and second gripping means each including four first pulleys 14, 14' disposed radially at an equal angular distance, four second pulleys 17, 17' disposed very close to the first pulleys 14, 14' in vertical and coplanar alignment therewith, and two pairs of each of first and second endless belt means 21, 24, 21', 24' trained arcuately around the first and second pulleys 14, 14', 17, 17'. Each of the pulleys 14, 14', 17, 17' had a total width of 80 mm and was composed of four freely rotatable identical pulley members having a diameter of 800 mm and a width of 15 mm. Each of the endless belt means included a pair of endless braid ropes of nylon 6—6 having a diameter of 10 mm. The tubular film was supplied to the apparatus by a pair of pinch rollers (not shown) at a speed of 15 m/min. The film 28 was gripped along four laterally spaced longitudinal portions between the belt means 21, 21' and the pulleys 14, 14' rotated at a peripheral speed of 30 m/min and by belt means 21, 21', and was stretched by moving the gripped longitudinal film portions along the first arcuate divergent paths substantially over a quarter of the full circumference of the respective pulleys 14, 14'. At the same time, heated air at 130° C. was introduced into the heating chamber (not shown) and applied to the film from both inside and outside. At the ends of the first arcuate divergent paths, the longitudinal film portions were introduced between the second pulleys 17, 17' and the belt means 24, 24', the second pulleys 17, 17' being rotated by the second belt means 24, 24' at a peripheral speed of 75 m/min. During movement of the gripped film portions along the second arcuate divergent paths substantially over a quarter of the full circumference of the pulleys 17, 17', the film was further stretched transversely. The stretched film 28 was released from the pulleys 17, 17' and, while being guided from inside on the belt means 21, 21', was introduced into a heat-treatment section where the film 28 was heated from both inside and outside thereof with heated air at 145° C. The hot air was also introduced into the heating chamber around the second arcuate divergent paths. The film was cooled to set and then severed at the longitudinal portions into four sheets 35 by means of cutter blades 33, 33', and the severed sheets 35 were withdrawn by withdrawal rollers 34. After being trimmed along the opposite edges each 40 mm in width, there were obtained four sheets of biaxially stretched film of good transparency having a width of 1400 mm and a thickness of 0.015 mm. The film had a tensile strength of 21 Kg/mm$^2$ and an elongation of 38% in longitudinal direction and a tensile strength of 18 Kg/mm$^2$ and an elongation of 52% in transverse direction.

EXAMPLE 2

To an apparatus similar to the apparatus 10 as shown in FIG. 1 was supplied a coagulated film of polyvinyl alcohol (degree of polymerization: 1700, degree of saponification: 99.5%), prepared by a wet method and having a width of 500 mm and a thickness of 0.1 mm, the film having rows of discrete slits extending transversely between the opposite selvages in staggered relation to one another, the slits each being 25 mm long and spaced 0.5 mm laterally, leaving 35 mm unslit for each selvage, and the rows being pitched 2 mm longitudinally. The film was preheated at 140° C. and gripped at the selvages between a pair of first pulleys and a pair of first endless belt means. The pulleys having a diameter of 1120 mm and spaced 400 from each other were rotated at a peripheral speed of 40 m/min, and at the same time, air heated at 160 was blown onto the film being stretched. At the ends of the pair of first arcuate divergent paths, the film selvages were gripped between a pair of second belt means and a pair of second pulleys having a diameter of 500 mm and rotated at a peripheral speed of 20 m/min., the pulleys being disposed very close to, or almost in contact with the first pulleys at a distance of about 0.5 mm so as to enable the film selvages to be transferred from the first pulleys to the second pulleys without slipping off. At that time, an auxiliary ring was used to press the selvages against the peripheral edge portions of the second pulleys. The film while being heated with heated air at a temperature of 190° C., was further stretched in transverse direction by the second pulleys and belt means until the film had a width of 1850 mm, and then was released from the second pulleys. The stretched film was withdrawn on quenching rolls to cool to set. Due to the difference in the peripheral speed between the first and second pulleys, the film selvages were corrugated or folded in the longitudinal direction of the film before they entered the pair of second arcuate divergent paths around the second pulleys, and the same time, live steam was sprayed over the folded selvages so that they were fused together, and the stretched film was withdrawn from the second pulleys the selvages remaining folded. The transversely stretched web was sandwiched between a pair of longitudinally stretched similar webs, bonded thereto with an adhesive aqueous solution of polyvinyl alcohol, dried and heat-treated. Thus, there was produced a nonwoven fabric of polyvinyl alcohol.

The apparatus of the present invention is substantially simple in structure, inexpensive to construct, operative with reduced energy consumption and will take up a relatively small space than the conventional tentering system. With the apparatus having a plurality of radially disposed sets of first and second gripping means, a plurality of sheets of stretched film can be produced at a high yielding rate. Further, the apparatus of the present invention is stable in operation and easier in heat-treatment after stretching than the conventional tubular system.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method of stretching a thermoplastic polymer film or fibrous web, comprising the steps of:
   (a) feeding the film or fibrous web longitudinally at a first speed;
   (b) stretching the film or fibrous web by
      (I) gripping the same along at least two laterally spaced first longitudinal portions between (1) the peripheries of at least two radially disposed first pulleys of substantially the same dimensions rotating at a peripheral second speed in opposite directions and (2) first endless belt means equal in number to the first pulleys, respectively trained around and running with the first pulleys, the first pulleys and the first endless belt means forming at least two first arcuate divergent paths, and moving the gripped first longitudinal portions respectively along the first arcuate divergent paths substantially over a quarter of the full circumference of the pulleys, and then
      (II) gripping the once-stretched film or fibrous web along at least two laterally spaced second longitudinal portions adjacent to said first longitudinal portions between (1) the peripheries of second pulleys of substantially the same dimensions, the second pulleys being equal in number to the first pulleys and respectively disposed downstream of and close to the first pulleys in coplanar relation thereto and rotating at a peripheral third speed in directions opposite to those of the respective first pulleys, and (2) second endless belt means equal in number to the second pulleys, respectively trained around and running with the second pulleys, the first and second belt means extending in two adjacent parallel planes, respectively, the second pulleys and the second endless belt means forming at least two second arcuate divergent paths contiguous to said first arcuate divergent paths, respectively, and moving the gripped second longitudinal portions respectively along said second arcuate divergent paths, the movement of the film along said first arcuate divergent paths and said second arcuate divergent paths being in only one direction throughout the stretching of the film wherein the film or fibrous web is in flattened tubular form, and the tubular film or fibrous web is supported at said first longitudinal portions from inside on respective portions of said first endless belt means disposed within the tubular film or fibrous web in abutment against said first longitudinal portions while it is longitudinally fed, is stretched by first being gripped along said first longitudinal portions between said portions of the first endless belt means and the peripheries of the first pulleys disposed outside the tubular film or fibrous web, and by being moved along said first arcuate divergent paths, and second by being gripped along said second longitudinal portions between respective portions of said second endless belt means disposed outside the tubular film or fibrous web and the peripheries of the second pulleys disposed within the tubular film or fibrous web, and by being moved along said second arcuate divergent paths, and after being stretched, is cut along said second longitudinal portions into a plurality of sheets at a portion adjacent to that where the tubular film or fibrous web is released from said second endless belt means and pulleys at the ends of said second arcuate divergent paths;
   (c) conditioning the film or fibrous web to a state suitable for stretching during the stretching thereof; and
   (d) withdrawing the twice-stretched film or fibrous web longitudinally at a fourth speed.

2. A method according to claim 1, wherein said peripheral second and third speeds of said first and second pulleys are different from one another.

3. A method according to claim 1, wherein the film or fibrous web is biaxially stretched by being fed at a peripheral first speed substantially equal to or smaller than the peripheral second and third speeds of the first and second pulleys and then withdrawn at a peripheral fourth speed substantially equal to or greater than the peripheral second and third speeds of the first and second pulleys.

4. A method according to claim 1, wherein said conditioning step comprises immersing the film or fibrous web in a bath of solvent or plasticizer during the stretching thereof.

5. A method according to claim 1, wherein said conditioning step comprises heating the film or fibrous web during the stretching thereof.

6. A method according to claim 5, wherein the film or fibrous web is heated at varying temperatures during the stretching thereof.

7. A method according to claim 1, wherein said second longitudinal portions are moved along a pair of parallel second longitudinal paths respectively extending from the ends of said second arcuate divergent paths, and the stretched film or fibrous web is heat-set while said second longitudinal portions are moved along said second longitudinal paths.

8. An apparatus for stretching a thermoplastic polymer film or fibrous web, comprising:
   (a) means for feeding the film or fibrous web at a first speed along a longitudinal path;
   (b) a first gripping means including
      (I) at least two first pulleys of substantially the same dimensions disposed radially with respect to a central line along which said longitudinal path extends and rotatable at a peripheral second speed in opposite directions, and
      (II) first endless belt means equal in number to said first pulleys, respectively trained around said first pulleys substantially over a quarter of the full circumference of said first pulleys for gripping the film or fibrous web at at least two laterally spaced first longitudinal portions along at least two first arcuate divergent paths between the peripheries of said first pulleys and said first endless belt means, whereby the film or fibrous web is stretched upon rotation of said first pulleys;
   (c) a second gripping means including
      (I) second pulleys of substantially the same dimensions, the second pulleys being equal in number to said first pulleys and respectively disposed downstream of and close to said first pulleys in coplanar relation thereto and rotatable at a peripheral third speed in directions opposite to those of the respective first pulleys;

(II) second endless belt means equal in number to the second pulleys, respectively trained around said second pulleys substantially over a quarter of their full circumferences for gripping the film or fibrous web at two laterally spaced second longitudinal portions adjacent to said first longitudinal portions along at least two second arcuate divergent paths between the peripheries of said second pulleys and said second endless belt means, said second arcuate divergent paths being contiguous to said first arcuate divergent paths, whereby the film or fibrous web is further stretched upon rotation of said second pulleys and whereby said film or web is stretched while moving only in one direction wherein said first endless belt means are also trained around said second pulleys along said second arcuate divergent paths, said second endless belt means are also trained around said first pulleys along said first arcuate divergent paths, each of said first and second pulleys includes at least two pulley members rotatable independently with respect to one another, each said first endless belt means is trained around one of said pulley members of each of said first and second pulleys, and each said second endless belt means is trained around the other pulley member of each of said first and second pulleys in parallel relation to said first endless belt means, (d) means for conditioning the film or fibrous web to a state suitable for stretching during the stretching thereof; and (e) means for withdrawing the stretched film or fibrous web.

9. An apparatus according to claim 8, wherein said first endless belt means are also trained around said second pulleys along said second arcuate divergent paths and have respective running paths including portions extending between the sets of said first and second pulleys along said longitudinal path of the film or fibrous web, and said second endless belt means are also trained around said first pulleys along said first arcuate divergent paths and have respective running paths including portions disposed on the outer side of said first and second pulleys.

10. An apparatus according to claim 8, wherein said first endless belt means are also trained around said second pulleys along said second arcuate divergent paths, said second endless belt means are also trained around said first pulleys along said first arcuate divergent paths, and all said first and second endless belt means have respective running paths including portions extending between the sets of said first and second pulleys along said longitudinal path of the film or fibrous web.

11. An apparatus according to claim 8, wherein said first endless belt means are also trained around said second pulleys along said second arcuate divergent paths, said second endless belt means are also trained around said first pulleys along said first arcuate divergent paths, and all said first and second endless belt means have respective running paths including portions disposed on the outer side of said first and second pulleys.

12. An apparatus according to claim 8, wherein said first and second gripping means are coplanar to the general plane of the film or fibrous web, and include two each of said first and second pulleys and two each of said first and second endless belt means disposed symmetrically with respect to said center line.

13. An apparatus according to claim 8, including means for cutting the stretched film or fibrous web into a plurality of sheets at a position adjacent to or downstream of that where the film or fibrous web is released from said second pulleys and endless belt means at the ends of said second arcuate divergent paths.

14. An apparatus for stretching a thermoplastic polymer film or fibrous web, comprising:

(a) means for feeding the film or fibrous web at a first speed along a longitudinal path;

(b) a first gripping means including (I) at least two first pulleys of substantially the same dimensions disposed radially with respect to a central line along which said longitudinal path extends and rotatable at a peripheral second speed in opposite directions, and (II) first endless belt means equal in number to said first pulleys, respectively trained around said first pulleys substantially over a quarter of the full circumference of said first pulleys for gripping the film or fibrous web at at least two laterally spaced first longitudinal portions along at least two first arcuate divergent paths between the peripheries of said first pulleys and said first endless belt means, whereby the film or fibrous web is stretched upon rotation of said first pulleys;

(c) a second gripping means including (I) second pulleys of substantially the same dimensions, the second pulleys being equal in number to said first pulleys and respectively disposed downstream of and close to said first pulleys in coplanar relation thereto and rotatable at a peripheral third speed in directions opposite to those of the respective first pulleys;

(II) second endless belt means equal in number to the second pulleys, respectively trained around said second pulleys substantially over a quarter of their full circumferences for gripping the film or fibrous web at two laterally spaced second longitudinal portions adjacent to said first longitudinal portions along at least two second arcuate divergent paths between the peripheries of said second pulleys and said second endless belt means, said second arcuate divergent paths being contiguous to said first arcuate divergent paths, whereby the film or fibrous web is further stretched upon rotation of second pulleys and whereby said film or web is stretched while moving only in one direction wherein said first endless belt means are also trained around said second pulleys along said second arcuate divergent paths, said second endless belt means are also trained around said first pulleys along said first arcuate divergent paths, said first and second endless belt means having respective running paths including portions extending contiguous to and downstream of second arcuate divergent paths in parallel relation to said center line.

* * * * *